United States Patent [19]

Cohen

[11] Patent Number: 5,044,742
[45] Date of Patent: Sep. 3, 1991

[54] CONTACT LENS
[76] Inventor: Amir Cohen, 53 Hatishbi Street, Haifa, Israel
[21] Appl. No.: 326,721
[22] Filed: Mar. 21, 1989
[30] Foreign Application Priority Data Mar. 24, 1988 [IL] Israel .................................. 85860

[51] Int. Cl.⁵ .............................................. G02C 7/04
[52] U.S. Cl. ................................. 351/161; 351/160 H
[58] Field of Search ............... 351/160 H, 160 R, 161, 351/162

[56] References Cited

U.S. PATENT DOCUMENTS 4,704,016 11/1987 de Carle .............................. 351/161
4,890,911 1/1990 Sulc et al. ........................ 351/160 H
4,923,296 5/1990 Erickson .............................. 351/161

Primary Examiner—Scott J. Sugarman
Attorney, Agent, or Firm—Beveridge, DeGrandi & Weilacher

[57] ABSTRACT

A contact lens comprising a central, optically active zone and a peripheral, optically nonactive zone, the lens having an anterior surface and a posterior surface, the posterior surface being constituted by the collective surfaces of a plurality of pad-like projections forming together a first, at least partially optically active surface, being the surface making contact with the cornea, the pad-like projections being separated from each other by a system of substantially interconnected recesses leading to the edge of the lens, the collective bottom surfaces of which recesses constitute a second, at least partially optically active surface, the system of recesses serving as reservoir for an increased tear volume and as passageway for increased tear flow, wherein the lens is consituted by a system of first lens elements each defined by the anterior surface on the one hand and the surface of the pad-like projection on the other, and by a system of second lens elements each defined by the anterior surface on the one hand and the bottom surface of the recesses on the other. When the recesses are filled with tears, the first and second lens elements are at least approximately of equal refractive power.

13 Claims, 5 Drawing Sheets

CONTACT LENS

BACKGROUND OF THE INVENTION

The present invention relates to a contact lens with a novel configuration of the posterior surface thereof, providing improved tear exchange and oxygen flow thereunder while the lens is being worn.

The invention also relates to a bifocal contact lens employing the simultaneous-vision principle and having a novel configuration of the posterior surface thereof.

The invention further relates to a bifocal contact lens employing the combined simultaneous alternating-vision principle.

Contact lenses are used primarily for correcting refractive aberrations of the eye such as astigmatism, myopia, presbyopia and others. The contact lens rests on the eye in contact with the cornea or the sclera, or both. The device serves as a new anterior refractive surface of the eye and retains some of the fluid between the cornea and the posterior surface of the lens.

Contact lenses presently known in the trade are divided into three main classes: soft lenses (hydrogels and silicon rubber), hard lenses (PMMA), and rigid gas permeable lenses (RGP). While contact lenses made of these materials each have their particular advantages and disadvantages, their common drawback is their inevitable interference with normal ocular metabolism and corneal health, primarily due to the greatly reduced oxygen supply and tear flow beneath the conventional contact lens which obviously lowers the rate of tear turnover which, in the uncovered cornea, is about 1.2 $\mu l/min$. As the normal tear volume is about 6 $\mu l$, the tear film, under average, normal conditions is replaced every five minutes. The tear film covering the cornea not only contains substances essential for lowering surface tension to maintain and enhance wettability of the epithelical surface of the cornea, but also supplies the oxygen vital for the metabolic processes sustaining the cornea, amongst them the enzymatic breaking down of glycogen, a high rate of which is essential for the normal functioning of the cornea. At the same time, tear flow is also instrumental in the flushing away of debris such as desquamated epithelial cells and various contaminants, most of which are products of the metabolic reactions.

In the absence of sufficient tear flow under a contact lens, the extended presence of the above debris and residues, and, first and foremost, oxygen deprivation or hypoxia, are liable to cause not only acute wearer discomfort, but severe clinical problems such as corneal abrasion, swelling, conjunctivitis and allergic reactions.

While the above-mentioned problems pertain to all contact lenses regardless of which material made, they are particularly pronounced with soft hydrogel lenses which are otherwise superior to hard and RGP lenses, particularly as to initial wearer comfort and easy fittability.

Although efforts have been made to improve contact lens performance with a view of remedy the above described shortcomings, none of the prior-art contact lenses have been known to give fully satisfactory service, in particular as far as extended-wear lenses are concerned.

While the above-mentioned problems are encountered with all types of contact lenses, mono- as well as bifocal, bifocal contact lenses of present design are known to suffer from an additional series of problems and limitations, such as poor distance or near vision, or both; poor wearer comfort: design features that run counter to the demands of ocular health: problems in locating the various bifocal segments and controlling position and orientation of the segment transition line and its degree of displacement relative to the pupil; presence of jump effect at the segment line and associated doubling of images; blurring at distance vision, and poor contrast sensitivity.

SUMMARY OF THE INVENTION

It is therefore one of the objects of the present invention to overcome the disadvantages and limitations of the prior-art contact lenses of both the mono and bifocal type and to provide a contact lens that is safe, comfortable, and exhibits minimal interference with normal ocular metabolism and physiology; that is adapted to retain an increased tear volume between the cornea and the posterior lens surface when worn, and provides free passage of tear flow into and through the space underneath the posterior lens surface to facilitate continuous supply of freshly oxygenated tears carrying also other ingredients necessary for corneal metabolism, as well as the flushing away of debris and waste products trapped between lens and cornea.

It is a further object of the invention to provide a contact lens which produces a significant tear-pumping effect activated by the blinking cycle of the eyelid.

It is still a further object of the invention to provide a simultaneous-vision contact lens, which, with the bifocal type of contact lens, provides a maximal aperture for incident light, which is restricted only by the natural pupil, independent of the lens alignment, centration or excursion and solves the problem, common to this type of lens, of loss of contrast sensitivity and blurring at distance vision, in particular at low light levels, due to the effect of the out-of-focus image on the in-focus image.

It is yet another object of the invention to provide a contact lens, which permits an other than 1:1 split between the respective amounts of light from distant and near objects in favour of distant objects, thereby improving contrast sensitivity and reducing blur, as near point (reading) vision is normally associated with adequate illumination levels, and that, with a combined simultaneous-alternating vision bifocal type of lens provides nonrotational positioning and a progressive, variable split ratio of the in-focus to the out-of-focus images, in accordance with the vertical position of the lens.

According to the invention, this is achieved by providing a contact lens comprising a central, optically active zone and a peripheral, optically nonactive zone, said lens having an anterior surface and a posterior surface, said posterior surface being constituted by the collective surfaces of a plurality of pad-like projections forming together a first, at least partially optically active surface, being the surface making contact with the cornea, said pad-like projections being separated from each other by a system of substantially interconnected recesses leading to the edge of said lens, the collective bottom surfaces of which recesses constitute a second, at least partially optically active surface, said system of recesses serving as reservoir for an increased tear volume and as passageway for increased tear flow, wherein said lens is constituted by a system of first lens elements each defined by said anterior surface on the one hand and the surface of said pad-like projection on the other, and by a system of second lens elements each defined by said anterior surface on the one hand and the bottom surface of said recesses on the other, and wherein, when said recesses are filled with tears, said first and said second lens elements are at least approximately of equal refractive power.

The invention also provides a simultaneous-vision, bifocal contact lens comprising a central, optically active zone and a peripheral, optically nonactive zone, said lens having an anterior surface and a posterior surface, said posterior surface being constituted by the collective surfaces of a plurality of pad-like projections forming together a first, at least partially optically active surface, being the surface making contact with the cornea, said pad-like projections being separated from each other by a system of substantially interconnected recesses leading to the edge of said lens, the collective bottom surfaces of which recesses constitute a second, at least partially optically active surface, said system of recesses serving as reservoir for an increased tear volume and as passageway for increased tear flow, wherein said lens is constituted by a system of first lens elements each defined by said anterior surface on the one hand and the surface of said pad-like projection on the other, and by a system of second lens elements each defined by said anterior surface on the one hand and the bottom surface of said recesses on the other, and wherein, when said recesses are filled with tears, said first and said second lens elements are of different refractive power, The invention further provides a combined simultaneous-alternating-vision, bifocal contact lens comprising a central, an intermediate and an outer optically active zone, and a peripheral, optically nonactive zone, said lens having an anterior surface and a posterior surface, said posterior surface being constituted by the collective surfaces of a plurality of pad-like projections forming together a first, at least partially optically active surface, being the surface making contact with the cornea, said pad-like projections being separated from each other by a system of substantially interconnected recesses leading to the edge of said lens, the collective bottom surfaces of which recesses constitute a second, at least partially optically active surface, said system of recesses serving as reservoir for an increased tear volume and as passageway for increased tear flow, wherein said lens is constituted by a system of first lens elements each defined by said anterior surface on the one hand and the surface of said pad-like projection on the other, and by a system of second lens elements each defined by said anterior surface on the one hand and the bottom surface of said recesses on the other, and wherein, when said recesses are filled with tears, said first and said second lens elements are of different refractive power, and wherein said contact lens is truncated, the truncating plane passing through said peripheral zone.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF THE PREFERRED EMBODIMENTS

Figure 1:
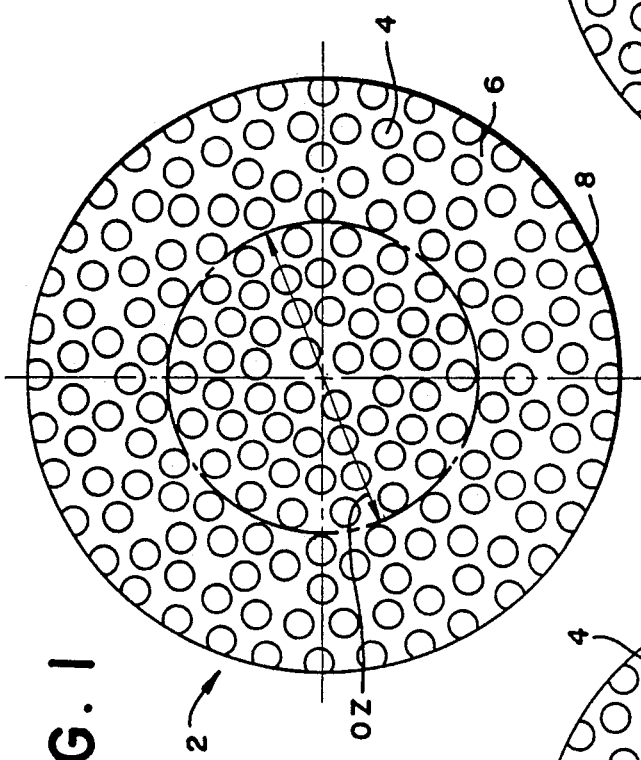
FIG. 1 illustrates the posterior surface of a first embodiment of the contact lens according to the invention.

Referring now to the drawings, there is seen in FIG. 1, the spherical posterior surface of a first embodiment of the contact lens according to the invention. This first surface is, in fact, constituted by the collective surfaces of a plurality (more than 10) of pad-like projections or pads 4 (of which at least ten are located at the optically active zone OZ), which pads are separated from each other by a system of interconnected recesses 6 leading to the edge 8 of the lens. The collective bottom surfaces of the recesses 6 constitute another, second, spherical surface. At least over the optically active zone OZ, which is at least as large as the largest pupil, both surfaces are of optical quality. The lens according to the invention is thus seen to be constituted by a system of first lens elements each defined by the anterior lens surface on the one hand and the surface of the pads 4 on the other, and by a system of second lens elements each defined by the anterior lens surface on the one hand, and the bottom surfaces of the recesses 6, on the other. When the lens is worn and the recesses 6 are filled with tears which obviously constitute an optical medium ($n_{tears} = 1.337$), the above-defined first and second lens elements are approximately, and for all practical purposes, of equal refractive power.

In the embodiment of FIG. 1, which is meant to be made of high water-content (60≅85%) hydrogel, the pads 4 are uniformly and quite densely distributed over the entire lens surface.

Given the example of a lens diameter D=14 mm, the pad diameter d=0.7 mm. the number of pads N=178, the depth of the recess h=0.05 mm, and the simplifying assumption that the lens is a flat disk, it is easily shown that the total disk area being $$A_0 = \frac{\pi D^2}{4} = 153.9 \text{ mm}^2$$

and the total pad area being $$N \frac{\pi d^2}{4} \; 68.5 \text{ mm}^2,$$

the resulting net recessed area $A_2 = A_0 - A_1 = 85.4$ mm². $A_2$ as a percentage of the total lens surface is $(A_2/A_0) \times 100 = 55.5\%$. Compared with a conventional lens, the area of contact of the lens with the cornea has been reduced by 55.5%.

The additional tear volume retained within the total recessed area being $V_2 = A_2 \times h = 4.3$ mm³, and assuming the thickness of the tear film under a conventional contact lens to be t=0.015 mm, resulting in a tear volume under such a lens of $V_0 = A_0 \times t = 2.3$ mm³, the increase in tear volume provided by the lens according to the invention will be $V_2/V_0 \times 100 = 187\%$.

Figure 2A:
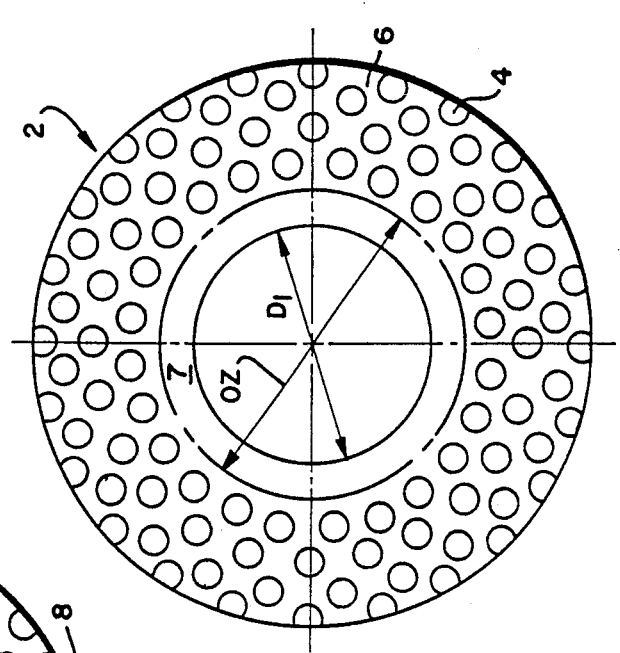
FIG. 2A represents the posterior surface of a third embodiment of the contact lens.
Figure 2:
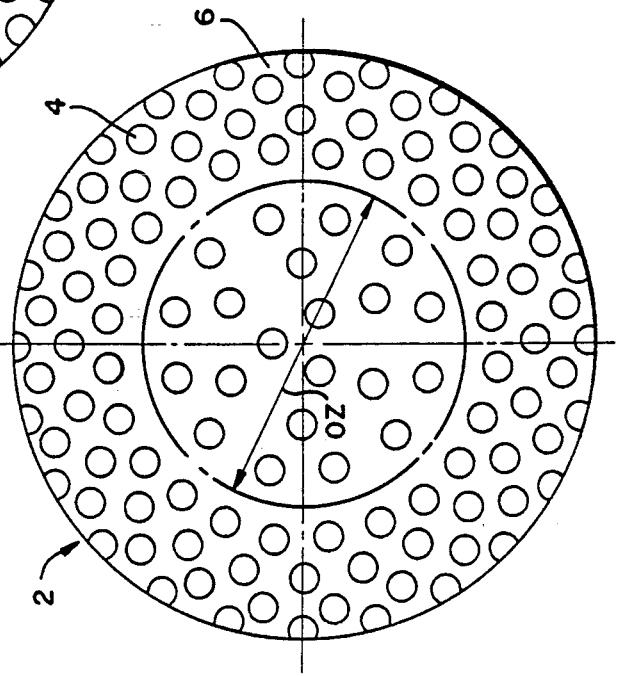
FIG. 2 represents the posterior surface of a second embodiment of the contact lens.

FIG. 2 represents another embodiment of the contact lens according to the invention. This lens is made of a medium water-content hydrogel which is far less oxygen-permeable than the high water-content hydrogel of the lens of FIG. 1. This reduced oxygen permeability is compensated for in two different ways:

1) the tear volume retained under the lens, as well as tear inflow and outflow aperatures at the lens edge are, as will be shown, significantly increased, and 2) a tear-pumping effect is brought into action, significantly increasing the rate of tear turnover. This effect will be discussed in greater detail further below.

The tear volume is increased by the simple expedient of reducing the density of the pads 4 within the optical zone. It is in fact this measure, that by increasing the recess "span" L between adjacent pads 4 (see FIG. 7), also facilitates the pumping effect, as will become apparent in conjunction with FIG. 7.

Given the basic parameters of the lens of FIG. 2, for example, D=14 mm; d=0.7 mm; N=117, and h=0.05, application of the calculations mentioned in conjunction with FIG. 1 indicate a total pad area $A_1$ of 45.0 mm², a total recessed area $A_2$ of 108.9 mm², a reduction of contact area of 70.8%, and an additional tear volume of $V_2$ of 5.4 mm³, which constitutes an increase of 235% over the tear volume retained by the conventional contact lens.

Still another embodiment of the contact lens according to the invention is shown in FIG. 2A. Here, the optically active zone OZ comprises a central, smooth and continuous surface of a diameter $D_1$ which is somewhat smaller than the diameter of the optically active zone, and a recessed, belt-like zone 7 interposed between this central surface and the peripheral, optically non-active zone which carries the pad-like projections 4, the top surfaces of which are complementary parts of the geometry of the smooth, central surface. The recessed, belt-like zone 7 obviously communicates with the system of recesses 6 of the peripheral zone.

When the lens is worn and the recessed, belt-like zone is filled with tears, it has approximately the same refractive power than the smooth, central lens zone.

The width of the recessed, belt-like zone 7 and its wall thickness are such as to produce the tear-pumping effect mentioned earlier and explained in detail further below.

This embodiment of the contact lens according to the invention is particularly suitable for hydrogel lenses of low water content or lenses of other materials of high refractive indices.

Figure 3:
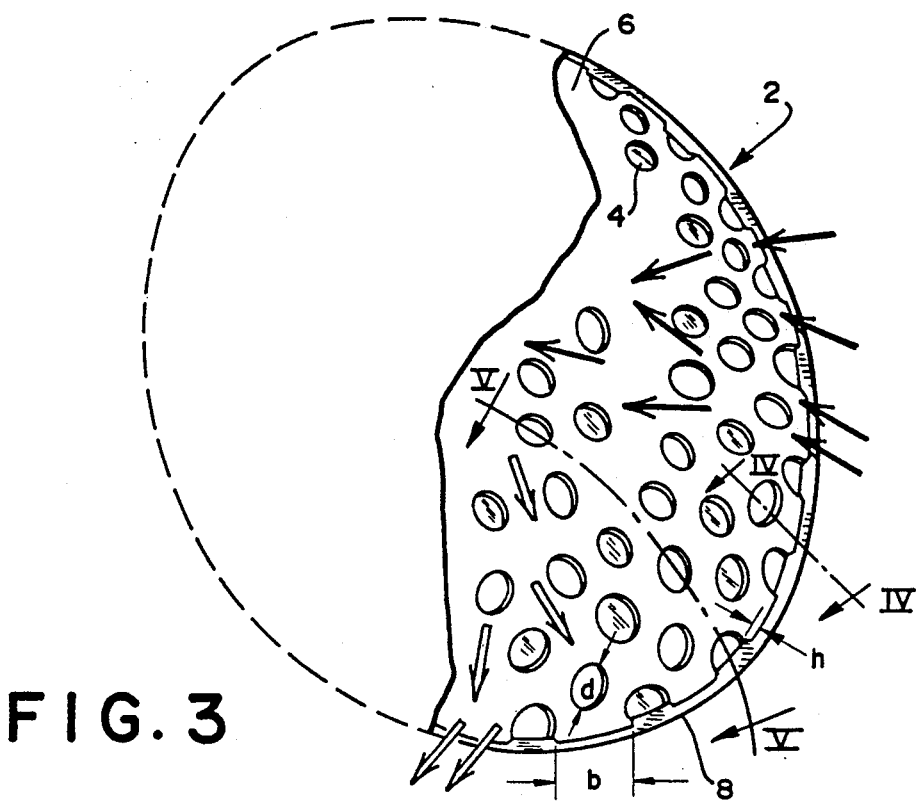
FIG. 3 is a partial perspective view of the posterior surface of the contact lens of FIG. 2.
Figure 4:
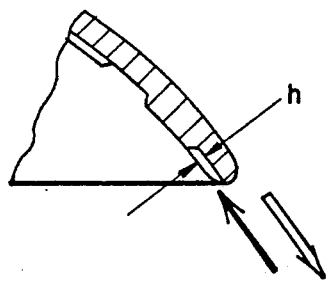
FIG. 4 shows a partial view, in cross section along plane IV—IV, of the lens of FIG. 3.
Figure 5:
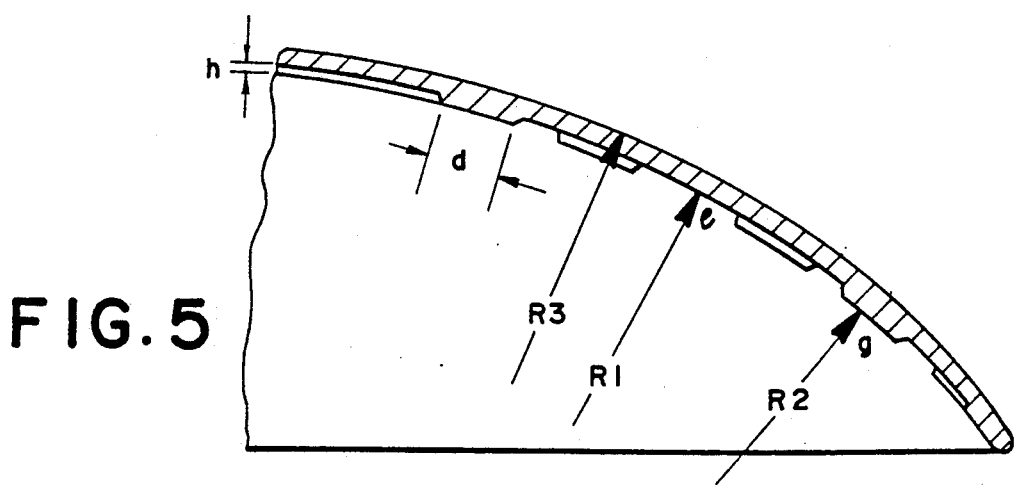
FIG. 5 is a partial view, in cross section along plane V—V, of the lens of FIG. 3.

The embodiment of FIG. 2 is further represented in FIGS. 3 to 5, in which the solid arrows denote tear inflow, and the outlined arrows, tear outflow. (It should be noted that, in FIGS. 4 and 5, the pads 4 located behind the cross-sectional plane, which would have appeared in various degrees of perspective distortion, have been omitted for reasons of clarity).

The enlarged inflow and outflow apertures provided by the contact lens according to the invention are easily calculated by the expression $C_1 \Sigma z b x h$ nbxh, where $C_1$ is the totality of tear apertures at the lens edge 8, b is the width of a single one of the apertures (see FIG. 3), h is their height (=depth of recesses 6) and n is the number of such apertures all around the lens. Given, as an example, b=1 mm, h=0.05 mm and n=24, $C_1 = 1.2$ mm².

Assuming the passage of tears underneath the edge of a conventional hydrogel lens to be provided by a gap of t=0.010 mm separating the lens edge from the scleral surface, the total available area for the passage of tears along the lens edge, is calculated by the expression: $C_0 O = \pi \times D x t$, where D=total lens diameter.

In the above example D=14.0 mm, hence $C_0 = \pi \times 14.0 \times 010 = 0.44$ mm².

The percentage increase of the aperture available for additional tear flow of the lens of FIG. 2 compared to a convention lens is thus $(C_1/C_0) \times 100 = 273\%$.

Such an increase provides a substantially larger passage for free tear flow, to allow supplementary supply of atmospheric oxygen and the nutrients required for normal corneal metabolism. It also provides ample clearance to allow the flushing away of waste products with the tear outflow.

FIG. 5 represents across section along plane V—V of FIG. 3, in which h denotes the recess height and d is the pad diameter. The optical radius of the recessed area, and the optical radius of the pad are designated by R1 and R2 respectively. R3 designates the anterior optical radius of the lens.

For ideal lens performance, free of refractive errors, the requirement R1=R2 must be met over the entire optical zone OZ of the lens. Certain refractive errors will be introduced when R1≠R2. For all practical purposes, however, these errors are negligible.

It should be noted that because of the presence of tear fluid, the higher the water content of the lens material, the lower the sensitivity to refractive errors, light diffraction effects, and other optical aberrations resulting from various geometrical discontinuities and inaccuracies of the posterior surface of a lens designed according to the present invention.

Figure 6:
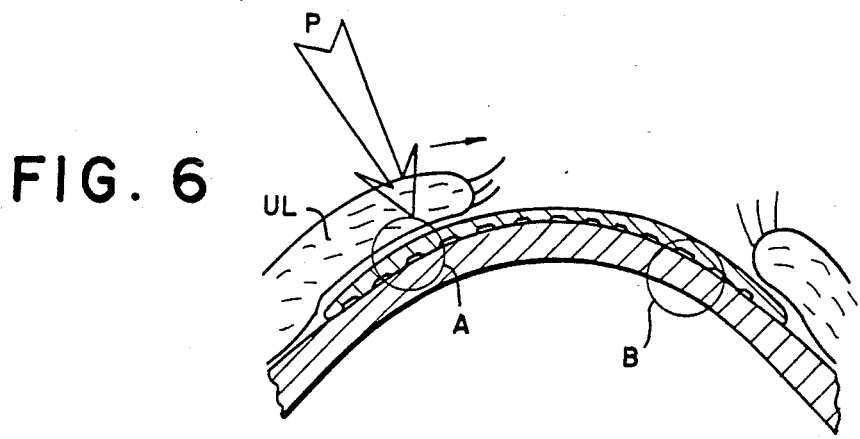
FIG. 6 shows a meridional cross section of a contact lens according to the invention as mounted on the user's eye, and with the upper eyelid in the process of being closed.
Figure 7:
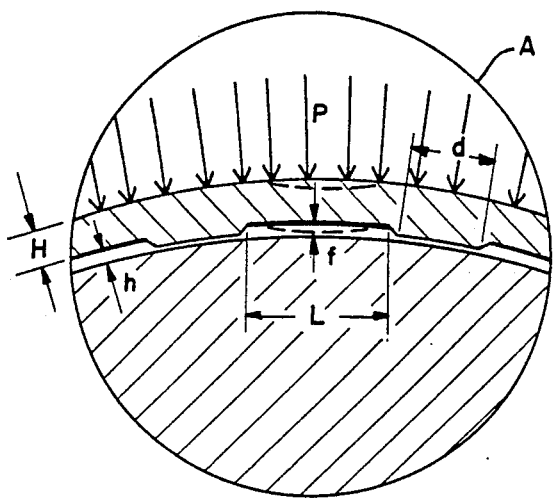
FIG. 7 shows the detail A of FIG. 6 greatly enlarged.

FIGS. 6 and 7 illustrate the operation of the tear pumping mechanism of the present invention.

A force P is exerted momentarily on the anterior lens surface by the blinking upper lid UL, in this particular case: at the location of the OZ transition point. This force is transformed into an evenly distributed pressure load (FIG. 7) of magnitude p acting on the respective region of the lens area. The pressure p, applied on the anterior surface, produces a certain downward deflection f of the lens material above the recessed space, which, in turn, causes a certain volume of tear fluid to be displaced. Upon removal of the pressure force, after blinking has been completed, the lens material will elastically recover to flex back to its initial position, thus producing the "suction" stroke of the pumping action.

A quantitative approximation of the effectiveness of this pumping action can be arrived at by adopting a mechanical model assuming a simple, freely supported beam of length L, having a rectangular cross section of height=H and width=d (see FIG. 7), under a uniformly distributed load p which, acting along the structure, results in elastic bending, causing a deflection f at the center of the beam.

With a hydrogel lens of 78% water content having a modulus of elasticity of E=30 gr/mm$_2$ and other parameters similar to those of the lens of FIG. 2, it can be shown that, assuming a blinking rate of 10 blinks/min, the output of this pumping mechanism will provide a full tear turnover every 3.25 min. which is well within the average normal condition, mentioned earlier, of five minutes.

Figure 8:
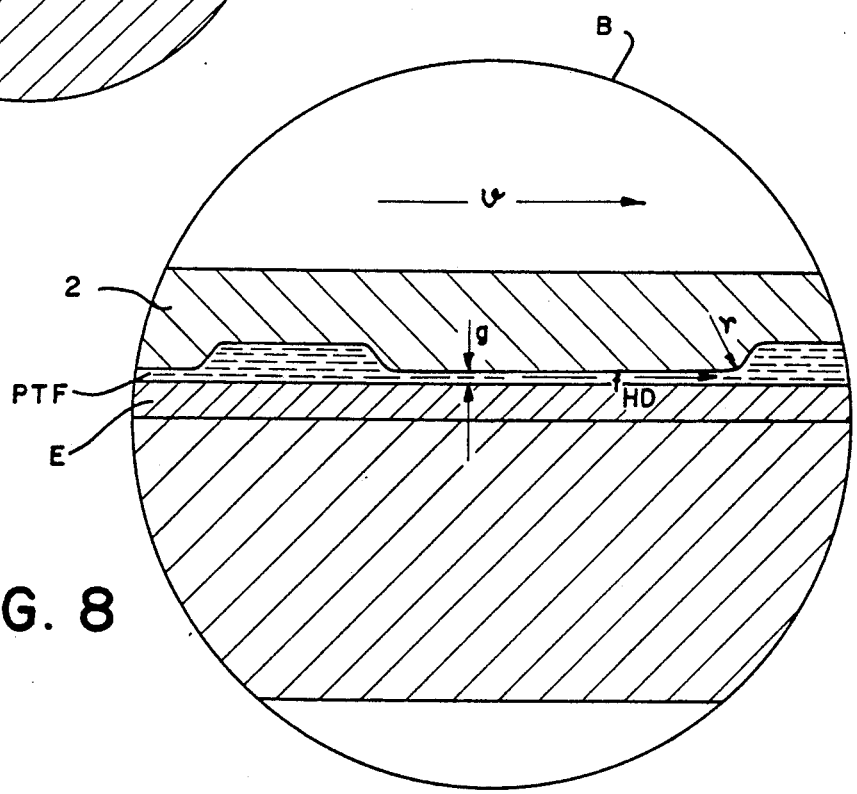
FIG. 8 represents the greatly enlarged detail B of FIG. 6.

FIG. 8 illustrates utilization of the dynamic effect of lens excursion. Accordingly, the pads are generating an hydrodynamic friction force $f_{HD}$, to provide moderate massaging of the corneal epithelium E. pad corners are blended (radius r) to avoid mechanical abrasion of the corneal superficial layer, eliminating excessive localized pressure points and also providing some lifting due to the hydrodynamic effect which is a result of the linear velocity v of the moving lens. The magnitude of the hydrodynamic friction force $f_{HD}$ is directly proportional to the capillary adhesion force acting on the lens, the lens velocity v, the tear fluid viscosity, and the gap height g. Such a mechanism encourages the frequent replacement of the precorneal tear film PTF and removal of desquamated epithelial cells, thereby improving the wetting properties of the precorneal film.

Figure 9:
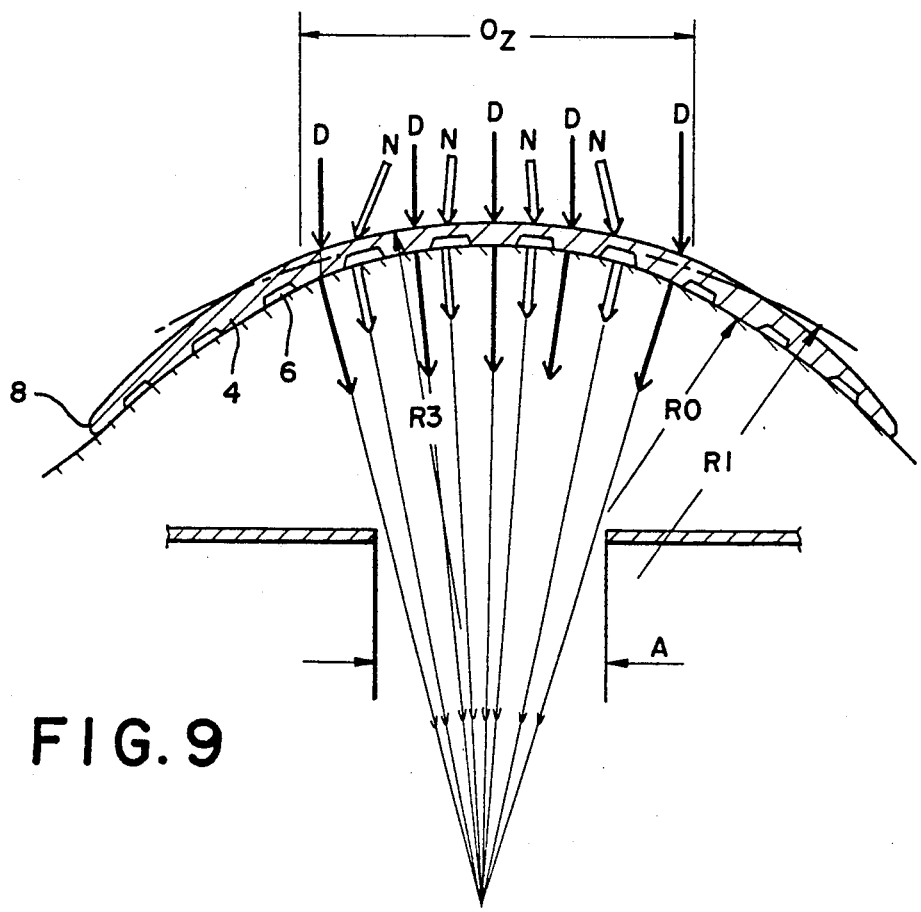
FIG. 9 is a meridional cross section of a simultaneous-vision bifocal embodiment of the contact lens according to the invention, as mounted on the wearer's eye.
Figure 10:
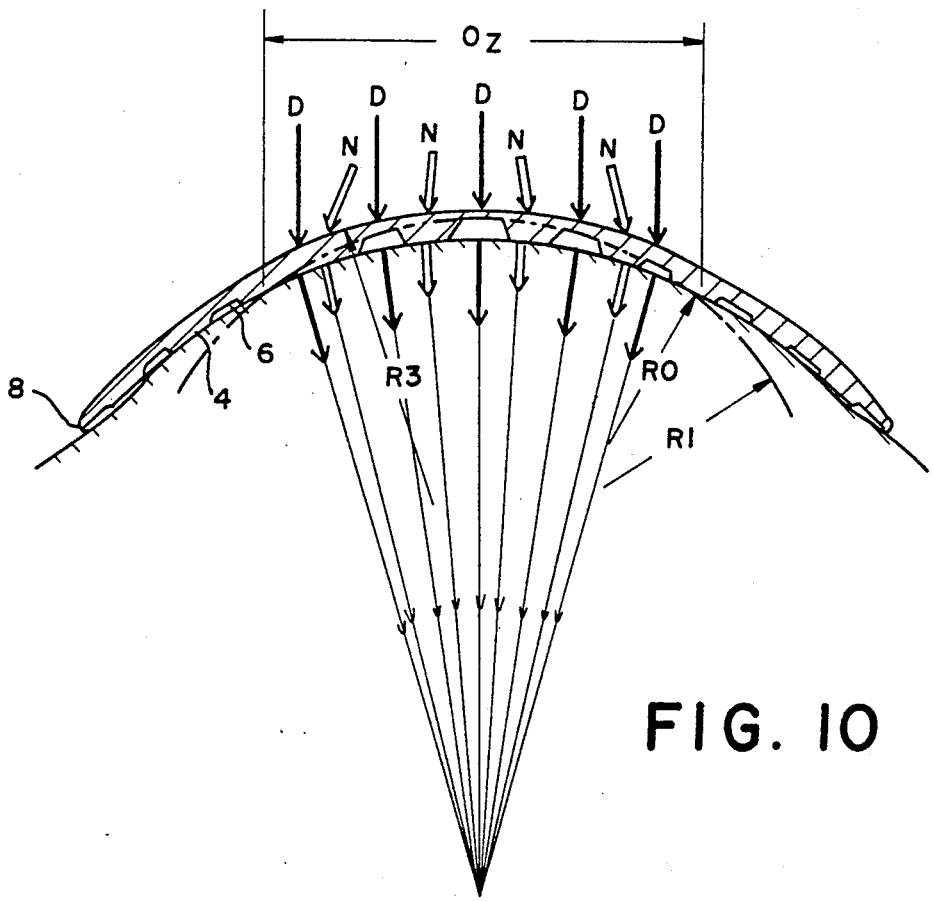
FIG. 10 shows a meridional cross section of another simultaneousvision bifocal embodiment of the contact lens according to the invention.

FIGS. 9 and 10 represent meridional cross sections of two different embodiments of simultaneous-vision bifocal contact lenses according to the invention, in which the incident light passes through a relatively large optical zone OZ and, after being refracted and divided into two images, goes through the pupil of a definite aperture A and then passes through the crystalline lens (not shown) of a given refractive power at distance vision (or supplementary accommodative power at near vision), to form an in-focus retinal image of either a near (N) or a distant (D) object. The image which at any particular instance is not "utilized" will in most instances appear as a slight blurr. However, the brain can be trained to ignore the unwanted blurr image and to perceive only the image wanted at any given instance.

The bifocal contact lens of FIG. 9 is in many aspects similar to the lenses of FIGS. 1 or 2. Like the latter, it is provided on its posterior surface with a plurality of pads 4 separated from each other by a system of recesses 6 leading to lens edge 8. In this embodiment too, the lens is constituted by a system of first and second lens elements as defined in conjunction with FIG. 1. However, whereas with the lenses of FIGS. 1 and 2 the refractive power of the first and second lens elements—when the system of recesses was filled with tears—was equal, here the refractive power of these elements differ.

The incident distance ray (solid arrow D) passes through the pads 4 which have an anterior radius R3 and a posterior radius R0, whereby R3>R0, so as to provide a negative power for distance correction:

$$F_D = \frac{n_L - n_A}{R_3} + \frac{n_A - n_L}{R_0},$$

where $n_L$ is the refractive index of the lens material and $n_A$ the refractive index of air, lens thickness being neglected for the sake of simplicity.

The incident near point ray (outlined arrow N) on the other hand, passes through the recessed areas where the lens and the tear fluid filling the recesses form a composite refractive element determined by spherical surfaces respectively defined by R0, R1 and R3, whereby R1>R3>R0, so as to provide a positive power for near correction:

$$F_N = \frac{n_L - n_A}{R_3} + \frac{n_T - n_L}{R_1} + \frac{n_A - n_T}{R_0},$$

where $n_T$ is the refractive index of the tear fluid. This correction produces an in-focus retinal near-point image. The two systems of lens elements together take up the entire optical zone OZ, the diameter of which is always larger than that of the pupil, thus the light passing through the lens is restricted only by the pupil diameter A (FIG. 9), The splitting ratio (amount of distance rays D to near point rays N) depends only on the area ratio: first lens elements/second lens elements, In FIG. 10 it is the distance rays D that pass through the recessed composite refractive element, while the near-point rays N pass through the pads 4, Here, R0>R3>R1, so as to provide a negative power for distance correction:

$$F_D = \frac{n_L - n_A}{R_3} + \frac{n_T - n_L}{R_1} + \frac{n_A - n_T}{R_0}.$$

resulting in an in-focus retinal image, The near-point incident rays N pass through the pads with the anterior radius R3 and the posterior radius R0, with R0>R3, so as to provide a power for near point correction:

$$F_N = \frac{n_L - n_A}{R_3} + \frac{n_A - n_L}{R_0},$$

resulting in an in-focus retinal near image.

Figure 11:
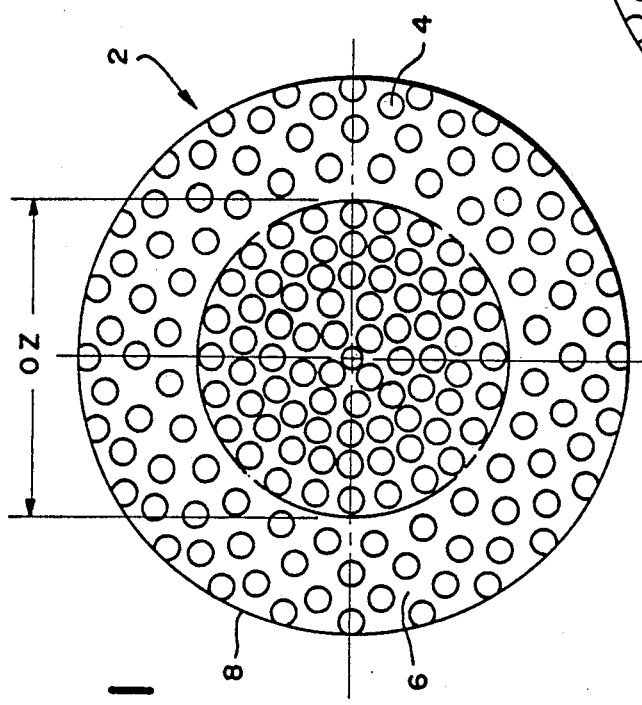
FIG. 11 illustrates the posterior surface of yet another simultaneousvision bifocal embodiment, in which the pad-like elements within the optical zone are arranged in a high-density pattern.

FIG. 11 represents a bifocal hydrogel lens which, due to its large diameter, is characterized by very small translation or excursion. The pad-like elements are distributed in a high-density pattern. This configuration, by way of example, may yield a coverage ratio of the pads at the optical zone of approximately 70%, thus providing an incident light split at a ratio of 1:2.33 (30:70) in favour of the distant image. It is well known that, at even split, the theoretical contrast sensitivity is reduced by 50% compared to that of singe vision. It can be shown that the resulting contrast sensitivity of this embodiment will be degraded only by 50:1.35=37%. which corresponds to a respective reduction of 26% in the amount of the blurr present at an even split.

Figure 13:
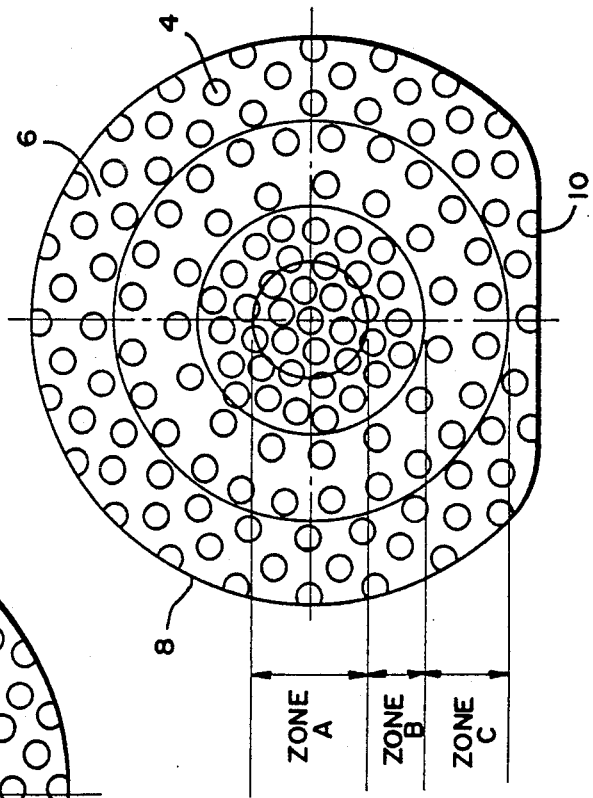
FIG. 13 represents the posterior surface of the contact lens of FIG. 12.
Figure 12:
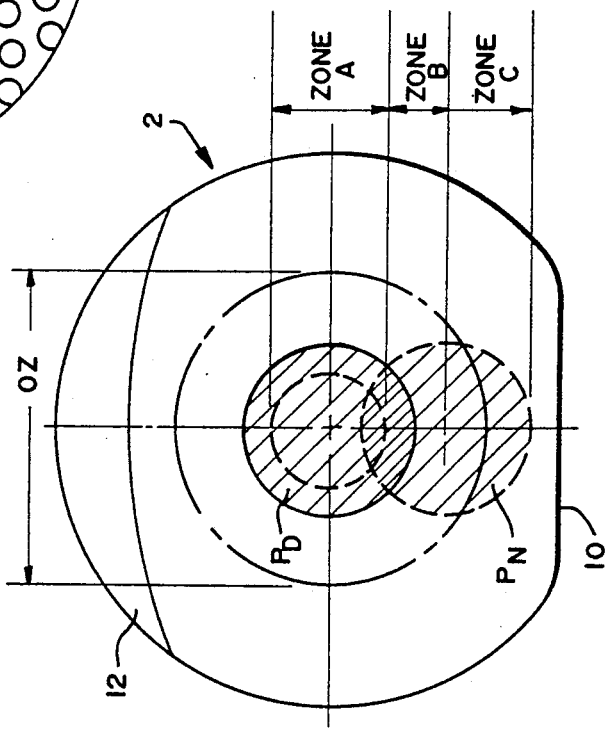
FIG. 12 shows the anterior surface of a combined simultaneous-alternating vision bifocal embodiment of the contact lens according to the invention.

FIGS. 12 and 13 are views of the anterior and posterior surface, respectively, of a combined simultaneousalternating-vision, bifocal contact lens according to the invention. This lens is suitable for a wide range of illumination levels and largely solves the problem of blurring and loss of contrast sensitivity due to degradation of the in-focus image by the out-of focus image, with minimal dependence on lens positioning and degree of lens displacement. The lens is vertically displaceable, but non-rotatable and the split ratio between near-point and distance light is progressively varying.

Vertical displaceability is effected by the lens edge truncation 10 which, resting on the lower lid, causes the lens to shift upwards relative to the eye, when the latter is tilted downwards, towards the typical near-vision position. Rotational stability of the lens is enhanced by the "slab off" 12, a lenticular, arcuate removal of material from the top of the lens which, due to the resulting downward shift of the center of gravity, provides a pendulum effect, ensuring the verticality of the meridional plane that is perpendicular to the truncation 10.

The lens is provided with three optically active zones A, B and C, while the peripheral zone is optically nonactive. The density of the pads, which constitute the lens element for the distance light, is seen to vary from zone to zone, being greatest in the central zone A and progressively dropping towards zone C. Actual densities are given in the Table further below.

The position of the wearer's pupil relative to the lens is indicated in FIG. 12 by the shaded circles, the upper circle $P_D$ corresponding to the pupil position at distant vision, the lower $P_N$, to near-point vision. As can be seen from the Table, at exclusive distance vision, using the central zone A, a large proportion of the incident light is used for the formation of the distant object image. With progressive tilting of the eye towards the near-vision position, this proportion drops and, at full near-vision position, becomes 1:0.42 in favour of near-point vision. The Table also indicates contrast sensitivity behaviour at the different zones.

|  | ZONE "A" | ZONE "B" | ZONE "C" |
| --- | --- | --- | --- |
| Zone diameters (mm) | 3.0 | 3.0;6.0 (annular) | 6.0;10.0 (annular) |
| Total zone area (mm$^2$) | 7.06 | 21.19 | 50.24 |
| Net number of pads | 13 | 24 | 39 |
| Total pads refractive area (mm$^2$) | 4.99 | 9.23 | 14.97 |
| % of Pads coverage | 70.7% | 43.5% | 29.8% |
| Light split ratio (Near:Distance) | 1:2.41 | 1:0.77 | 1:0.42 |
| Distance/near factor | 2.41 | 0.77 | 0.42 |
| Near/distance factor | 0.41 | 1.30 | 2.38 |
| Decrease of contrast sensitivity (blurr) - | | | |
| at distance vision: | 36.7% | 57.0% | 78.9% |
| at near point vision: | 78.9% | 44.5% | 36.7% |

While in the embodiments shown, the pads 4 are seen to have a circular outline, other outlines, too, can be envisaged, such as oval, polygonal and even irregular.

Although the invention was described mostly with reference to hydrogel lenses, its principles are generally applicable to any of the known lens materials. For instance, the bifocal contact lenses described will give superior results also when produced from hard-lens materials.

It will be evident to those skilled in the art that the invention is not limited to the details of the foregoing illustrative embodiments and that the present invention may be embodied in other specific forms without departing from the spirit or essential attributes thereof.

The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A contact lens comprising a central, optically active zone and a peripheral, optically nonactive zone, said lens having an anterior surface and a posterior surface, said posterior surface being constituted by the collective surfaces of a plurality of pad-like projections forming together a first, at least partially optically active surface, being the surface making contact with the cornea, said pad-like projections being separated from each other by a system of substantially interconnected recesses leading to the edge of said lens, the collective bottom surfaces of which recesses constitute a second, at least partially optically active surface, said system of recesses serving as reservoir for an increased tear volume and as passageway for increased tear flow, wherein said lens is constituted by a system of first lens elements each defined by said anterior surface on the one hand and the surface of said pad-like projection on the other, and by a system of second lens elements each defined by said anterior surface on the one hand and the bottom surface of said recesses on the other, and wherein, when said recesses are filled with tears, said first and said second lens elements are at least approximately of equal refractive power.

2. The contact lens as claimed in claim 1, wherein the thickness of said second lens elements is such as to make them susceptible and elastically responsive to a pressure produced by the eyelid when blinking.

3. The contact lens as claimed in claim 1, wherein said pad-like projections are distributed over said posterior surface at a substantially uniform density.

4. The contact lens as claimed in claim 1, wherein said pad-like projections are distributed over said posterior surface in such a way that their density in said central, optically active zone of the lens is lower than their density in said peripheral zone.

5. A contact lens comprising a central, optically active zone and a peripheral, optically nonactive zone, said lens having an anterior surface and a posterior surface, said posterior surface being constituted by a central, optically active surface, at least a major portion of which is a smooth, continuous surface, and by a peripheral, optically nonactive surface, being formed by the collective surfaces of at least ten pad-like projections, which surfaces are complementary parts of the geometry of said smooth, central surface, but are separated from each other by a system of substantially interconnected recesses leading to the edge of said lens, said recesses serving as reservoir for an increased tear volume and as passageway for increased tear flow, wherein a minor portion of said optically active zone is constituted by a recessed, belt-like zone interposed between said smooth, central surface and said peripheral zone, said recessed, belt-like zone and said system of interconnected recesses of said peripheral zone communicating with each other, and wherein, when said recessed, belt-like zone is filled with tears, that portion of said contact lens incorporating said belt-like zone and that portion of said contact lens incorporating said smooth, central surface are at least approximately of equal refractive power.

6. The contact lens as claimed in claim 5, wherein the width of said recessed, belt-like zone and its wall thickness are such as to make said zone susceptible and elastically responsive to a pressure produced by the eyelid when blinking.

7. A simultaneous-vision, bifocal contact lens comprising a central, optically active zone and a peripheral, optically nonactive zone, said lens having an anterior surface and a posterior surface, said posterior surface being constituted by the collective surfaces of a plurality of pad-like projections forming together a first, at least partially optically active surface, being the surface making contact with the cornea, said pad-like projections being separated from each other by a system of substantially interconnected recesses leading to the edge of said lens, the collective bottom surfaces of which recesses constitute a second, at least partially optically active surface, said system of recesses serving as reservoir for an increased tear volume and as passageway for increased tear flow, wherein said lens is constituted by a system of first lens elements each defined by said anterior surface on the one hand and the surface of said pad-like projection on the other, and by a system of second lens elements each defined by said anterior surface on the one hand and the bottom surface of said recesses on the other, and wherein, when said recesses are filled with tears, said first and said second lens elements are of different refractive power.

8. The simultaneous-vision, bifocal contact lens as claimed in claim 7, wherein at least over said optically active zone the radius of curvature of said first surface is smaller than the radius of curvature of said second surface.

9. The simultaneous-vision, bifocal contact lens as claimed in claim 7, wherein at least over said optically active zone the radius of curvature of said first surface is larger than the radius of curvature of said second surface.

10. The simultaneous-vision, bifocal contact lens as claimed in claim 7, wherein said pad-like projections are distributed over said posterior surface in such a way that their density in said central, optically active zone is higher than their density in said peripheral zone.

11. A combined simultaneous-alternating-vision, bifocal contact lens comprising a central, an intermediate and an outer optically active zone, and a peripheral, optically nonactive zone, said lens having an anterior surface and a posterior surface, said posterior surface being constituted by the collective surfaces of a plurality of pad-like projections forming together a first, at least partially optically active surface, being the surface making contact with the cornea, said pad-like projections being separated from each other by a system of substantially interconnected recesses leading to the edge of said lens, the collective bottom surfaces of which recesses constitute a second, at least partially optically active surface, said system of recesses serving as reservoir for an increased tear volume and as passageway for increased tear flow, wherein said lens is constituted by a system of first lens elements each defined by said anterior surface on the one hand and the surface of said pad-like projection on the other, and by a system of second lens elements each defined by said anterior surface on the one hand and the bottom surface of said recesses on the other, and wherein, when said recesses are filled with tears, said first and said second lens elements are of different refractive power, and wherein said contact lens is truncated, the truncating plane passing through said peripheral zone.

12. The combined simultaneous-alternating-vision, bifocal contact lens as claimed in claim 11, wherein said lens is provided with a lenticular, arcuate cut located substantially diametrically opposite to said truncated portion.

13. The combined simultaneous-alternating-vision, bifocal contact lens, as claimed in claim 11, wherein the density of said pad-like projections progressively increases from said outer optically active one towards said central optically active zone.

* * * * *